United States Patent
Kore

(10) Patent No.: US 9,443,405 B2
(45) Date of Patent: Sep. 13, 2016

(54) WIRELESS VOICE ALARM AND PUBLIC ANNOUNCEMENT SYSTEM

(71) Applicant: Honeywell International Inc., Morristown, NJ (US)

(72) Inventor: Vinayak Sadashiv Kore, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/583,937

(22) Filed: Dec. 29, 2014

(65) Prior Publication Data
US 2016/0189504 A1    Jun. 30, 2016

(51) Int. Cl.
| | |
|---|---|
| G08B 1/08 | (2006.01) |
| G08B 13/22 | (2006.01) |
| G08B 25/00 | (2006.01) |
| G08B 25/10 | (2006.01) |
| H04W 74/08 | (2009.01) |
| H04W 84/18 | (2009.01) |

(52) U.S. Cl.
CPC ............ *G08B 13/22* (2013.01); *G08B 25/007* (2013.01); *G08B 25/10* (2013.01); *H04W 74/0816* (2013.01); *H04W 84/18* (2013.01)

(58) Field of Classification Search
CPC . G08B 13/22; H04W 74/0816; H04W 84/18
See application file for complete search history.

(56) References Cited

U.S. PATENT DOCUMENTS

| | | | |
|---|---|---|---|
| 6,542,739 B1 * | 4/2003 | Garner ............... | H04B 7/18539 455/1 |
| 6,861,952 B1 * | 3/2005 | Billmaier ............ | G08B 25/009 340/286.02 |
| 7,787,882 B2 * | 8/2010 | Feher .................... | H04M 11/04 370/355 |
| 8,194,571 B2 * | 6/2012 | Herrmann ............. | H04L 12/12 370/254 |
| 8,194,592 B2 * | 6/2012 | Kore ..................... | H04W 84/18 370/328 |
| 9,123,219 B2 | 9/2015 | Kore et al. | |
| 2006/0065510 A1 * | 3/2006 | Kiko ..................... | H01H 9/161 200/1 R |
| 2008/0057883 A1 * | 3/2008 | Pan ...................... | H03F 1/0277 455/127.1 |
| 2013/0336292 A1 | 12/2013 | Kore et al. | |
| 2016/0029346 A1 * | 1/2016 | Suresh ................ | H04W 72/005 340/539.16 |

* cited by examiner

*Primary Examiner* — Erin File
(74) *Attorney, Agent, or Firm* — Husch Blackwell LLP

(57) ABSTRACT

An apparatus is provided, wherein the apparatus includes an audio annunciator of a security system that protects a secured geographic area, a first wireless interface of the annunciator that wirelessly exchanges synchronization and channel maintenance messages with a control panel of the security system under a TDMA format, and a second wireless interface of the annunciator that wirelessly exchanges alarm messages with the control panel of the security system through a second wireless interface under a CSMA/CA format, the second wireless interface being maintained in a deactivated state until an alarm message is detected from the control panel through the first wireless interface, the second interface being activated in response to the alarm message, wherein audio information is thereafter streamed from the control panel to the annunciator through the second wireless interface.

21 Claims, 1 Drawing Sheet

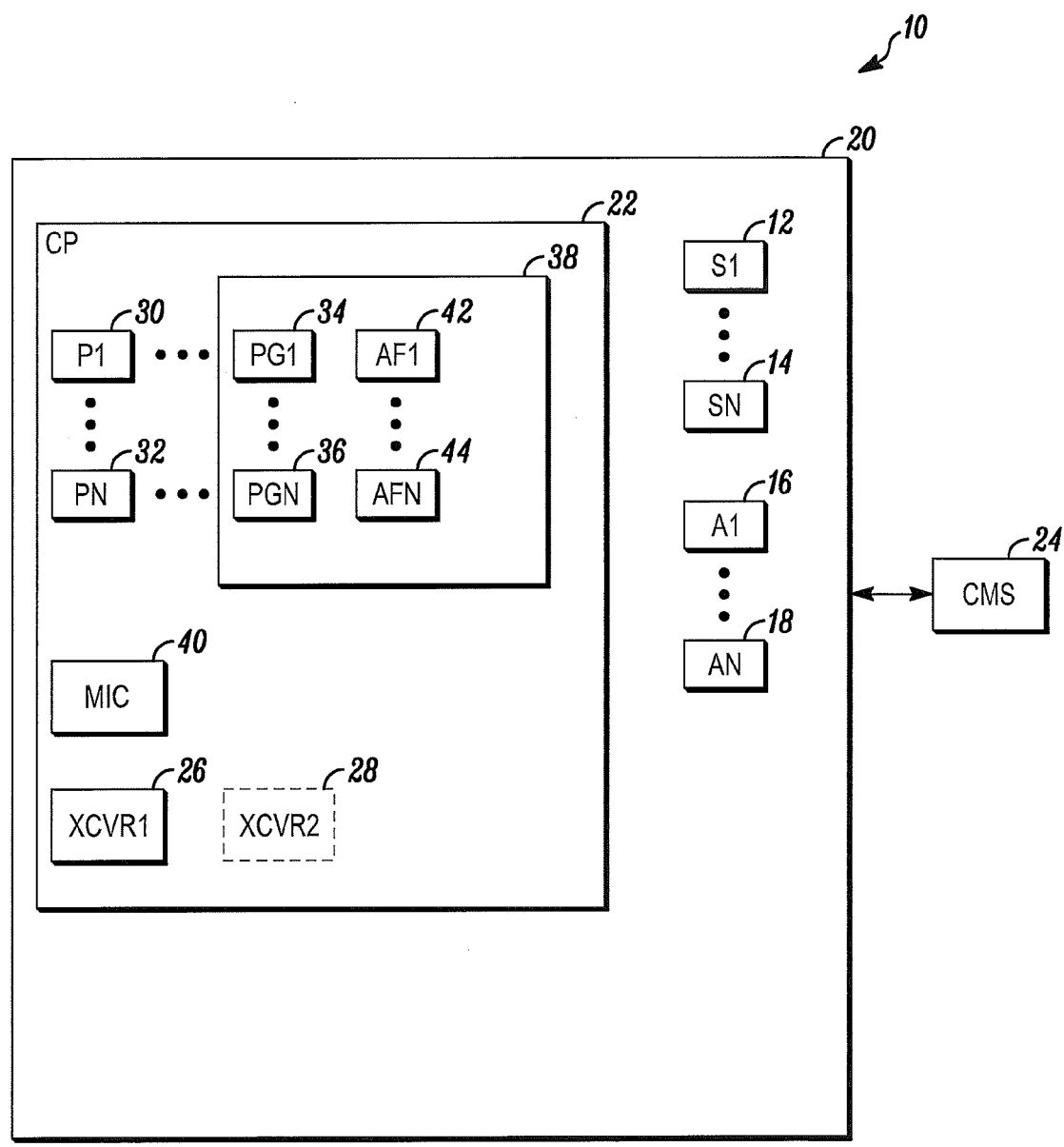

WIRELESS VOICE ALARM AND PUBLIC ANNOUNCEMENT SYSTEM

FIELD

This application relates to security systems and public address systems.

BACKGROUND

Systems are known to protect people and assets within secured areas. Such systems are typically based upon the use of one more sensors that detect threats within the secured area.

Threats to people and assets may originate from any of a number of different sources. For example, a fire may kill or injure occupants who have become trapped by a fire in a home. Similarly, carbon monoxide from a fire may kill people in their sleep. Alternatively, an unauthorized intruder, such as a burglar, may present a threat to assets and/or people within a secured area.

In the case of intruders, sensors may be placed and used in different areas based upon the different uses of the secured space. For example, if the space is normally occupied by people, then sensors may only be placed along a periphery of the secured area. If the space is normally vacant then sensors may be distributed throughout the area. Fire sensors are normally placed throughout the space.

In most cases, threat detectors are connected to a local control panel. In the event of a threat detected via one of the sensors, the control panel may sound a local audible alarm. The control panel may also send a signal to a central monitoring station.

In addition to a local alarm, it may be necessary to notify and guide occupants out of the secured space in the event of an emergency. In this case, a public address or announcement system may be incorporated into or used in conjunction with the security system to automatically notify occupants of threats.

While security and fire systems work well, they are sometimes expensive to set up and use, especially when the system covers a large area and large numbers of sensors and audio warning devices are necessary. Accordingly, a need exists for better methods of expediting such processes.

BRIEF DESCRIPTION OF THE DRAWINGS

FIG. 1 illustrates a simplified block diagram of a system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same, and is not intended to limit the application or claims to the specific embodiment illustrated.

FIG. 1 is a simplified block diagram of a security and public address system 10 shown generally in accordance with an illustrated embodiment. Included within the system may be a number of sensors 12, 14 and annunciators 16, 18 used to protect a secured geographic area 20.

The sensors may be based upon any of a number of different types of technology. For example, some of the sensors may be limit switches placed on the doors and windows providing entrance into and egress from the secured area. Other of the sensors may be passive infrared (PIR) detectors distributed throughout the interior of the secured area that are intended to detect intruders who have been able to circumvent sensors located along a periphery of the secured area.

The sensors may also include one or more environmental detectors. For example, some of the detectors may be smoke or carbon monoxide detectors. Other of the environmental detectors may be natural gas or toxic gas detectors.

The annunciators may also be based upon a number of different alerting technologies intended to warn occupants within the secured area of detected threats. For example, at least some of the annunciators are wireless speakers. Other of the annunciators may be buzzers or flashing lights.

A control panel 22 may monitor the sensors for activation and, in response, activate one or more of the annunciators to warn occupants. In addition, the control panel may also compose and send an alarm message to a central monitoring station 24. The central monitoring station may respond by summoning the appropriate help (e.g., police, the fire department, etc.).

The control panel is wirelessly coupled to some or all of the sensors and annunciators via one or more radio frequency transceivers or radios 26, 28 located within the control panel and each, some, or all of the sensors and annunciators.

Included within the control panel and each of the sensors and annunciators is one or more processor apparatus (processors) 30, 32, each operating under control of one or more computer programs 34, 36 loaded from a non-transitory computer readable medium (memory) 38. As used herein, reference to a step performed by a computer program is also reference to the processor that executed that step.

The system of FIG. 1 may be characterized as a security system with a public address or announcement system or a security system with a separate capability for implementing a public address system. In this regard, an alarm processor may monitor each of the sensors for activation and, upon detecting activation, may activate one or more of the annunciators as part of a voice alarm/voice evacuation system. If the sensor is a fire detector, then the fire processor or a separate audio processor may retrieve the appropriate audio warning from a corresponding audio file 42, 44 and play a word content of the audio file through one or more of the speakers (annunciators). The audio file may warn occupants, via one or more voice messages, of the presence of a fire and its location. If the alarm is based upon the detection of carbon monoxide, then the audio file may warn occupants of the specific threat of a toxic gas and the response that they should take, including a route to the nearest exit and areas to avoid.

Each of the sensors and annunciators has its own unique system address. Accordingly, a word message may be custom designed for the area in which a sensor has detected a threat.

Alternatively, the speaker/annunciators may be used as a public address system. In this situation, the system may route audio information from a microphone 40 to the appropriate speakers 16, 18.

In general, wireless annunciators are usually powered by battery. These devices often receive audio information in the form of streaming audio of short duration. However, they also need to monitor the integrity of the communication link to the audio source in terms of the quality of the radio frequency (RF) links/paths between devices (speakers, microphones, control panel, etc.) and the health of the devices themselves. For the majority of the time, the wireless devices of the system are non-functional because, during periods of non-use, they merely exchange network maintenance messages or, alternately, they sleep. However, power consumption, even during periods of non-use in low power modes, may still be sufficient to render battery powered operation of these devices unfeasible when used with smaller or less expensive batteries.

In many cases, a high power consuming radio is often needed to exchange data at the high data rate associated with streaming traffic to and from each device and to achieve a practical communication range. The battery life of devices based upon such radios can be very low, resulting in frequent battery replacement and high maintenance costs. This is because of the high transmit and receive power consumption and also because even the sleep mode power consumption of such devices is often too high for battery operation.

In addition, devices of these audio systems need to be synchronized in order to provide high fidelity voice messages. The high fidelity of such messages further adds to the power consumption.

In order to address these needs, the system of FIG. 1 uses a single, dual power mode transceiver 26 having a relatively low power mode and a relatively high power mode. Alternatively, the system uses two separate transceivers, including a relatively low power transceiver 26 for establishing and maintaining a communication link between the control panel and each speaker of the annunciators and a relatively high power transceiver 28 for streaming audio from the control panel to the respective speakers. The low power radio (either using the low power mode of the dual power mode transceiver or the low power transceiver) uses a time division multiple access (TDMA) format during normal operation of the system (no system alarms, no public address messages) where the devices are simply exchanging messages for maintaining network synchronization and link integrity. The high power radio (either using the high power mode of the dual mode transceiver or the high power transceiver) uses a carrier sense multiple access and collision avoidance (CSMA/CA) format for channel access when audio alarm messages are to be streamed to the speaker. This scheme improves the overall network throughput because a maximum possible data rate on each link can be used.

In general, the low power radio and high power radio may operate within the same or different non-overlapping frequency spectrums. Under some embodiments, the low power and high power radios operate within their own respective repeating super frames.

The sensors and annunciators may each form a communications link or channel with the control panel in the low power mode as described in U.S. Pat. No. 8,194,592. Each sensor and annunciator (node) can have a parent-child relationship with two neighboring nodes which are in wireless range of the child node. Associating two parent nodes with each child node provides redundancy in communications.

The parent-child relationships extending from the control panel to the farthest node establish a cascading relationship where data from each child is aggregated with parent data. To aggregate data, child nodes in the upstream direction are allocated slots of the TDMA frame before their parent nodes. This allows a child's data to be aggregated with the data of its parent for transmission to the control panel in the parent's slot.

Data from the control panel sent to the closest parent in the downstream direction may be a mirror image of the aggregated data in the upstream direction. In this case, the first block of data in the aggregated data transmitted within the parent's slot contains the parent data. The next block contains the data of the nearest child.

Addressing can be either implicit or explicit. Explicit addressing of each data block is the default mode. When the data load exceeds a threshold value, then implicit addressing is used.

Between active slots, the nodes enter a sleep mode. Each parent only awakes for its assigned transmit and receive slots and the slots in which it receives data from and transmits data to its direct children.

As each node is first activated, it passively monitors for a beacon from the control panel. The beacon from the control panel may identify the frequency spectrum and super frame characteristics of the low power radio as well as the high power radio.

If the node is too far from the control panel to detect the beacon, then the node identifies a status or health message from the nearest 4 nodes based upon signal strength. The 4 nearest nodes are identified by the node as a potential parent node in the parent-child relationship. Once identified, the node transmits a slot request message to the control panel through one of the 4 nearest nodes.

The control panel receives the slot request message and allocates a slot to the new node and also allocates two parents to the node. The allocated slot is always earlier than the slot assigned to the two parents.

The two assigned parents simultaneously receive data from the child in the child's assigned slot. The parents each aggregate the child's data with their own and transmit the data to the control panel. The control panel receives the redundant data from both parents and discards one copy.

In general, sensors only have a relatively low-power radio. Annunciators have a dual mode radio or a high and low power radio.

If a threat is detected by one of the sensors, a monitoring processor of the sensor transmits a message to the control panel using the low power radio. In response, the control panel transmits an activation message to the appropriate annunciators causing the corresponding annunciators to activate the high power radio. The message may be addressed only to annunciators proximate the activated sensor(s) or to all annunciators.

In response, the annunciator may activate the high power radio under the CSMA/CA format. The high power radio may listen for other users operating on the spectrum of the high power radio. If no other users are detected, the high power radio may transmit an acknowledgement to the activation message received through the low power radio. The control panel may receive the acknowledgement from the annunciator through the high power radio and begin streaming audio to the annunciator through the high power radio. The annunciator may receive the streamed audio and reproduce the streamed audio through a speaker of the annunciator.

In addition or as an alternative to steaming audio information to annunciators having speakers, the control panel may also stream strobe information. The strobe information may be used by the annunciators to synchronize visual and/or audio indicators from each annunciator.

The capability of the control panel to support public announcements may operate in the same manner. In this case, the public address system may be activated by a user pressing a PA button and selecting a geographic region for the announcement. The control panel responds by sending an activation signal to the corresponding annunciators having speakers. The annunciators respond as discussed above.

In general, the system operates in a normal or streaming mode. Normal mode is used when there is no voice alarm to be streamed. Streaming mode is used when voice alarm(s) or paging message(s) are being streamed.

Under one illustrated embodiment, the system operates as a synchronized mesh within a single frequency spectrum in a normal mode under an IEEE802.11 format. In the normal scenario (no alarms, no PA messages), all devices sleep while a small portion of each device monitors link integrity.

When voice activity is detected, the network is awakened by a message in the next cascading super frame. All devices remain awake during voice announcements. All devices operate under a CSMA/CA format. When the user hangs up, the system re-enters the mesh setup.

The use of dual modes supports a higher average network throughput than full-time TDMA. The use of the high power mode supports a greater number of audio channels. The capacity of each audio channel is greater. Battery life is still acceptable due to the low voice activity duty cycle.

In the high power mode, audio packet transmissions from the control panel may be timed separately in order to avoid collisions. Because of the higher power level, fewer relaying devices are needed to reach a particular annunciator.

Within the system, a single radio can be used in the normal mode and streaming mode communication. Alternatively, if power consumption of the streaming radio is not acceptable for battery operation, a separate ultra low power radio can be used during normal mode. In such case, the streaming radio is powered off during normal mode.

If separate radios are used, RF range (and power output) of the ultra low power radio and streaming mode radio is matched to the environment to obtain equal range and communication reliability in both modes. The power of the high power radio may be adjusted to the range between the high power radio and the control panel. The power of the low power radio need only be adjusted to reach the closest parent device in a mesh network. The two radios may use different modulation techniques, different frequency bands and different transmit power. Under this embodiment, the low power radio may operate at 900 MHz under an IEEE802.15.4 format. The high power radio may operate under an IEEE802.11ac format.

The high data rate, high power radios go into a deep sleep until a call is established via the cascading node network. A routing processor within the control panel may be used to identify the minimum number of nodes that are needed to stream audio to annunciators. Battery life may be balanced among devices by changing routes to get the best network wide battery life and performance.

Long packets and back to back packets may be used to reduce the transmit and receive durations. Annunciators may be synchronized for reception of packets based upon the periodicity of messages. For example, if 10 packet-sets/second are used to carry the audio data, then each packet-set is expected at 100 ms intervals. As such, a processor within the annunciator allows the annunciator to sleep until the next packet-set is expected.

In addition, multiple streams of audio data may be aggregated. In this regard, streamed packets may be aggregated to allow maximum sleep time for annunciators.

The network formation, recovery, maintenance, trouble, and non-speech alarm communication occurs according to the low power system discussed above. This can be implemented over a single radio if its power consumption is acceptable (i.e., the annunciator is close enough to the control panel so that a low power radio can reach the control panel). If the power consumption of high power, high data rate streaming is high (i.e., the annunciator is relatively distant from the control panel and an elevated amount of transmit power is needed), then a separate ultra low power radio may be used with the annunciator.

The scheme of using high and low power radios and a common beacon ensures that tight time synchronization is maintained on the network. A processor of the annunciator monitors the link(s) for integrity in terms of link qualities and device drops. Due to the TDMA mode of operation, the devices consume minimal power.

Redundant routes and parent child relations are discovered during the normal mode for use in the streaming mode. The routes and parent child relations are modified based on messages exchanged during the normal mode, depending on link strength, variations, and device additions, drops, or failures.

During the normal mode of operation, the system also determines the presence of other wireless fire systems in the neighborhood and establishes synchronization with its devices. These can be used for synchronous action of alarm devices on both wireless fire networks and voice alarm networks. The synchronization can also be used to avoid interference between the two networks.

When a user accesses a microphone station of the public address system or if an alarm message is received by the control panel, wireless packets are transmitted to all devices in the network to exit the normal mode and enter the streaming mode. The user is provided with an indication of system readiness after all devices enter the steaming mode. This could results in a small initial delay in message transmission.

Once in the streaming mode, devices do not follow the TDMA super frame structure for communication. Rather, a CSMA/CA or listen before talk channel access mechanism is used.

The radios adjust their power and/or data rate to achieve the highest possible reliable data rate for communicating with each other. If IEEE802.11 radios are used for streaming, then the data rate can be automatically determined by their rate adaptation algorithm. In other cases, a predetermined or automatically determined best data rate can be used on each link.

A number of appropriate schemes are used to avoid hidden node problems which can otherwise lead to collisions and retransmission in the network, thereby reducing network throughput and quality of service.

To avoid collisions in a network having two fire systems, the audio traffic is generated while ensuring a longest possible gap between audio packets from two sources. For example, if each source generates 10 packets per second (100 ms gap between two packets) and there are 4 sources in the network, then their packet generation will be separated to have a 25 ms gap.

To further reduce collisions, the number of relay transmissions is reduced by careful choice of routing nodes. This choice is made during the normal mode in such a way that each speaker device in the network gets each packet redundantly while minimal devices are involved in routing and relaying. For example, if a network has 100 devices and each of the 100 devices is involved in routing (which could result in many collisions), then a smaller number of arterial devices are chosen to route the message to the entire network. This will vary based on network topology.

In general, the system includes an audio annunciator of a security system that protects a secured geographic area, a first wireless interface of the annunciator that wirelessly exchanges synchronization and channel maintenance messages with a control panel of the security system under a TDMA format, and a second wireless interface of the annunciator that wirelessly exchanges alarm messages with the control panel of the security system through a second wireless interface under a CSMA/CA format, the second wireless interface being maintained in a deactivated state until an alarm message is detected from the control panel through the first wireless interface, the second interface being activated in response to the alarm message, wherein audio information is thereafter streamed from the control panel to the annunciator through the second wireless interface.

Alternatively, the system includes an audio annunciator of a security system that protects a secured geographic area, a first wireless transceiver of the annunciator that wirelessly exchanges synchronization and channel maintenance messages with a control panel of the security system under a TDMA format, and a second wireless transceiver of the annunciator that wirelessly exchanges alarm messages with the control panel of the security system under a CSMA/CA format, the second wireless transceiver being maintained in a deactivated state until an alarm message is detected from the control panel through the first wireless transceiver, the second transceiver being activated in response to the alarm message, wherein audio information is thereafter streamed from the control panel to the annunciator through the second wireless transceiver.

Alternatively, the system includes a security system that protects a secured geographic area, a plurality of wireless sensors of the security system that detect threats within the secured area, at least one audio annunciator of the security system, a first wireless interface of the at least one annunciator that wirelessly exchanges synchronization and channel maintenance messages with a control panel of the security system under a TDMA format through one of the plurality of sensors or another of the at least one annunciator, and a second wireless interface of the at least one annunciator that wirelessly exchanges alarm messages with the control panel of the security system through a second wireless interface under a CSMA/CA format, the second wireless interface being maintained in a deactivated state until an alarm message is detected from the control panel through the first wireless interface, the second interface being activated in response to the alarm message, wherein audio information is thereafter streamed from the control panel to the annunciator through the second wireless interface.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be added to, or removed from the described embodiments.

The invention claimed is:

1. An apparatus comprising:
   an audio annunciator of a security system that protects a secured geographic area;
   a first wireless interface of the audio annunciator that wirelessly exchanges synchronization and channel maintenance messages with a control panel of the security system under a time division multiple access (TDMA) format and receives an activation message from the control panel; and
   a second wireless interface of the annunciator that wirelessly receives audio information from the control panel of the security system under a carrier sense multiple access and collision avoidance (CSMA/CA) format, wherein the second wireless interface is maintained in a deactivated state until the activation message is detected from the control panel through the first wireless interface, wherein the second wireless interface is activated in response to the activation message, and wherein the audio information is thereafter streamed from the control panel to the audio annunciator through the second wireless interface.

2. The apparatus as in claim 1 wherein the audio annunciator further comprises a plurality of audio annunciators, and wherein each of the plurality of audio annunciators is wirelessly coupled to the control panel.

3. The apparatus as in claim 2 wherein the plurality of audio annunciators further comprises at least some speakers.

4. The apparatus as in claim 3 wherein the at least some speakers further comprise a public address system.

5. The apparatus as in claim 2 wherein the security system further comprises a plurality of wireless sensors.

6. The apparatus as in claim 5 wherein the first wireless interface further comprises a relatively low power radio frequency transceiver coupled to the control panel via a mesh network including at least one of the plurality of audio annunciators and the plurality of wireless sensors.

7. The apparatus as in claim 5 wherein the second wireless interface further comprises a relatively high power level radio frequency transceiver wirelessly coupled directly to the control panel.

8. The apparatus as in claim 1 wherein the first and second wireless interfaces further comprise a dual mode radio frequency transceiver that alternatively operates at one of a relatively low power level and a relatively high power level.

9. The apparatus as in claim 1 wherein the audio annunciator further comprises a power supply including a battery.

10. An apparatus comprising:
    an audio annunciator of a security system that protects a secured geographic area;
    a first wireless transceiver of the audio annunciator that wirelessly exchanges synchronization and channel maintenance messages with a control panel of the security system under a time division multiple access (TDMA) format and receives an activation message from the control panel; and
    a second wireless transceiver of the audio annunciator that wirelessly receives audio information from the control panel of the security system under a carrier sense multiple access and collision avoidance (CSMA/CA) format, wherein the second wireless transceiver is maintained in a deactivated state until the activation message is detected from the control panel through the first wireless transceiver, wherein the second wireless transceiver is activated in response to the activation message, and wherein the audio information is thereafter streamed from the control panel to the audio annunciator through the second wireless transceiver.

11. The apparatus as in claim 10 wherein the audio annunciator of the security system further comprises a plurality of audio annunciators and a plurality of wireless sensors.

12. The apparatus as in claim 11 further comprising a mesh network that establishes a wireless connection between the audio annunciator and the control panel through one or more of the plurality of audio annunciators and the plurality of wireless sensors.

13. The apparatus as in claim 11 further comprising an alarm processor of the control panel that monitors each of the plurality wireless sensors for activation thereby indicating an alarm event.

14. The apparatus as in claim 13 further comprising a plurality of message files within a memory of the control panel, wherein each of the plurality of message files corresponds to a location of one of the plurality of wireless sensors.

15. The apparatus as in claim 13 further comprising a message processor that correlates an activated one of the plurality of wireless sensors with one of the plurality of message files.

16. The apparatus as in claim 15 further comprising a processor that retrieves the audio information from the correlated one of the plurality of message files and streams the audio information to the audio annunciator.

17. The apparatus as in claim 15 further comprising a processor that receives the audio information from a microphone and streams the audio information to the audio annunciator.

18. An apparatus comprising:
a security system that protects a secured geographic area;
a plurality of wireless sensors of the security system that detect threats within the secured geographic area;
at least one audio annunciator of the security system;
a first wireless interface of the at least one audio annunciator that wirelessly exchanges synchronization and channel maintenance messages with a control panel of the security system under a time division multiple access (TDMA) format through one of the plurality of wireless sensors or another of the at least one audio annunciator and receives an activation message from the control panel; and
a second wireless interface of the at least one audio annunciator that wirelessly receives audio information from the control panel of the security system through a second wireless interface under a carrier sense multiple access and collision avoidance (CSMA/CA) format, wherein the second wireless interface is maintained in a deactivated state until the activation message is detected from the control panel through the first wireless interface, wherein the second wireless interface is activated in response to the activation message, and wherein the audio information is thereafter streamed from the control panel to the audio annunciator through the second wireless interface.

19. The apparatus as in claim 18 wherein the first and second wireless interfaces further comprise only one radio operating under an IEEE802.11 protocol.

20. The apparatus as in claim 18 wherein the first wireless interface further comprises a relatively low power radio operating under an IEEE802.15.4 protocol and the second wireless interface further comprises a relatively high power radio operating under an IEEE802.11ac protocol.

21. The apparatus as in claim 18 further comprising a plurality of audio files saved in a memory of the control panel, wherein each of the plurality of audio files corresponds to one of the plurality of wireless sensors.

* * * * *